(12) United States Patent
Ruckman et al.

(10) Patent No.: US 7,284,299 B2
(45) Date of Patent: Oct. 23, 2007

(54) CASTER

(75) Inventors: Thomas Ruckman, Winchester, VA (US); Robert Lawrence Kibbe, Jr., Winchester, VA (US); Jeffrey A. Chochinov, Stephens City, VA (US)

(73) Assignee: Rubbermaid Commercial Products LLP, Winchester, VA (US)

( * ) Notice: Subject to any disclaimer, the term of this patent is extended or adjusted under 35 U.S.C. 154(b) by 23 days.

(21) Appl. No.: 11/074,002

(22) Filed: Mar. 8, 2005

(65) Prior Publication Data

US 2006/0200937 A1    Sep. 14, 2006

(51) Int. Cl.
*B60B 33/00* (2006.01)
*A47B 91/00* (2006.01)

(52) U.S. Cl. .................. 16/31 R; 16/18 R; 16/39

(58) Field of Classification Search .......... 16/20, 16/18 R, 45, 21, 24, 25, 37, 38, 39, 31 R, 16/40, 42 T
See application file for complete search history.

(56) References Cited

U.S. PATENT DOCUMENTS

| 1,341,630 A | * | 6/1920 | Chesnutt ............. 16/21 |
| 1,375,536 A | * | 4/1921 | Ostrander .......... 16/19 |
| 2,090,960 A | * | 8/1937 | Konkle .............. 16/21 |
| 2,500,854 A | * | 3/1950 | Mullen et al. ...... 16/21 |
| 2,724,858 A | * | 11/1955 | Reichert ............ 16/36 |
| 3,194,293 A | * | 7/1965 | Kindley ............. 152/327 |
| 3,964,124 A | | 6/1976 | Crawford |
| 4,067,083 A | | 1/1978 | Greene |
| 4,084,288 A | | 4/1978 | Black |
| 4,097,954 A | | 7/1978 | Christensen |
| 4,213,225 A | | 7/1980 | Timmer |
| 4,219,903 A | | 9/1980 | Black |
| 4,224,714 A | | 9/1980 | Seipos |
| 4,295,256 A | | 10/1981 | Pascal |
| RE31,110 E | | 12/1982 | Black |
| 4,409,715 A | | 10/1983 | Timmer |
| 4,432,116 A | | 2/1984 | Schultz |
| 4,494,271 A | * | 1/1985 | Perlin et al. ........ 16/21 |
| 4,554,704 A | | 11/1985 | Raffaeli |
| 4,620,342 A | | 11/1986 | Haussels |
| 4,707,880 A | | 11/1987 | Doyle et al. |
| 4,777,697 A | | 10/1988 | Berndt |
| 5,074,572 A | | 12/1991 | Delmerico et al. |
| 5,109,569 A | * | 5/1992 | Shaw ................. 16/44 |
| 5,199,131 A | | 4/1993 | Harris |
| 5,214,823 A | | 6/1993 | Screen |
| 5,287,594 A | | 2/1994 | Hicks |
| 5,305,496 A | | 4/1994 | Gagnon et al. |
| 5,394,589 A | | 3/1995 | Braeger et al. |
| 5,493,755 A | | 2/1996 | Kindstrand et al. |

(Continued)

FOREIGN PATENT DOCUMENTS

JP    57158104 A  *  9/1982

(Continued)

*Primary Examiner*—Katherine Mitchell
*Assistant Examiner*—Andre' L. Jackson
(74) *Attorney, Agent, or Firm*—Foley & Lardner LLP

(57) ABSTRACT

A moveable body includes at least one caster. The caster has a yoke, a wheel supported on the yoke, and an interface member for attaching the caster to the moveable body. Additionally, the caster is configured so that a noise level of the moveable body as the moveable body travels over a surface is approximately 85 decibels or less.

6 Claims, 5 Drawing Sheets

U.S. PATENT DOCUMENTS

| | | | |
|---|---|---|---|
| 5,568,671 | A | 10/1996 | Harris et al. |
| 5,593,461 | A | 1/1997 | Reppert et al. |
| 5,732,441 | A | 3/1998 | Janian |
| 5,733,015 | A * | 3/1998 | Demarest et al. ........ 301/5.307 |
| 5,797,611 | A | 8/1998 | Joseph et al. |
| 5,809,612 | A | 9/1998 | Finch |
| 5,813,090 | A * | 9/1998 | Miles ........................... 16/37 |
| 5,875,518 | A | 3/1999 | Walker |
| 6,047,439 | A | 4/2000 | Stearn |
| 6,530,119 | B2 | 3/2003 | Yeh |
| 6,698,060 | B1 | 3/2004 | Lee |
| 6,748,623 | B1 | 6/2004 | Tsai |
| 2002/0004968 | A1 | 1/2002 | Yeh |
| 2002/0069479 | A1 | 6/2002 | Kuo |
| 2002/0166201 | A1 | 11/2002 | Plate |
| 2004/0006844 | A1 | 1/2004 | Modlhammer |
| 2004/0060149 | A1 | 4/2004 | Chang |
| 2004/0134027 | A1 | 7/2004 | Guttmann et al. |

FOREIGN PATENT DOCUMENTS

| | | | |
|---|---|---|---|
| JP | 60135304 A | * | 7/1985 |
| JP | 61077501 A | * | 4/1986 |
| JP | 06239103 A | * | 8/1994 |

* cited by examiner

CASTER

BACKGROUND OF THE INVENTION

1. Field of the Invention

The present invention relates to a caster and, more particularly, to a caster having improved vibratory characteristics.

2. Description of Related Art

Traditionally, casters have been incorporated onto a moveable object to create a transport system that can be moved from one location to another. For example, dollies and carts have been outfitted with casters and used to transport heavy items such as boxes, supplies, tools, and equipment. Selection of an appropriate caster for a particular application is determined by various factors, including load weight, operating environment, and floor condition.

A conventional transport system incorporating casters generates noise as the transport system moves over a surface due to vibration caused by excessive movement of components in the caster assembly. In certain environments, such as hospitals, long-term care facilities, schools, and offices, excessive noise is unacceptable. Accordingly, the Occupational Safety and Health Administration (OSHA) has developed regulations setting forth acceptable noise exposure levels for various workplace environments. Moreover, noise generated by conventional transport systems restricts the time certain activities can be conducted. For example, cleaning carts using conventional casters can disrupt classes in schools and meetings in offices if cleaning takes place during the day. Similarly, such cleaning carts can disrupt sleeping patients in hospitals and care facilities if cleaning takes place at night.

In an effort to reduce noise generated by conventional transport systems, devices such as sound absorbers and vibration dampers (e.g., lead base tape) have been employed. Such devices can be installed on the transport system to absorb vibration and/or deaden its travel. Additionally, some conventional casters utilize a softer tread material to absorb vibration. One disadvantage of such devices is that they do not sufficiently reduce noise generated by the transport system. Another disadvantage of such devices is that they merely absorb vibration and/or deaden its travel but do not eliminate the source of the vibration.

SUMMARY OF THE INVENTION

An aspect of the present invention relates to a caster. The caster includes a yoke, a wheel including a hub, an axle, and an interface member for attaching the yoke to a moveable body. The yoke has a support member and first and second legs extending from an underside of the support member. The wheel has a first end disposed adjacent the first leg of the yoke and a second end disposed adjacent the second leg of the yoke, and the axle extends through the hub to rotatably support the wheel between the first and second legs of the yoke. The interface member has a first portion provided on the support member of the yoke and a second portion facing the first portion and being configured such that the yoke can swivel about a vertical axis relative to the second portion. A vertical clearance between the first and second portions of the interface member is approximately 0.02 inches or less. A total clearance between the first and second ends of the hub and the first and second legs of the yoke is approximately 0.032 inches or less. A clearance between an inner diameter of the hub and an outer diameter of the axle is approximately 0.008 inches or less. The wheel includes a tread material having a Shore A hardness of approximately 65 durometers or less.

Another aspect of the present invention relates to a moveable body. The moveable body includes at least one caster. The caster has a yoke, a wheel supported on the yoke, and an interface member for attaching the caster to the moveable body. Additionally, the caster is configured so that a noise level of the moveable body as the moveable body travels over a surface is approximately 85 decibels or less.

Yet another aspect of the present invention relates to a caster. The caster includes a yoke including a support member and first and second legs extending from an underside of the support member, a wheel rotatably supported between the first and second legs of the yoke by an axle, and an interface member for attaching the yoke to a moveable body. The interface member has a first portion provided on the support member of the yoke and a second portion facing the first portion and being configured such that the yoke can swivel about a vertical axis relative to the second portion. A vertical clearance between the first and second portions of the interface member is approximately 0.02 inches or less.

BRIEF DESCRIPTION OF THE DRAWINGS

The accompanying drawings, which are incorporated in and constitute a part of this specification, illustrate a preferred embodiment of the invention and together with the description, serve to explain principles of the invention.

DETAILED DESCRIPTION OF PREFERRED EMBODIMENT

Reference will now be made in detail to a presently preferred embodiment of the invention, an example of which is illustrated in the accompanying drawings. An effort has been made to use the same reference numbers throughout the drawings to refer to the same or like parts.

Figure 3A:
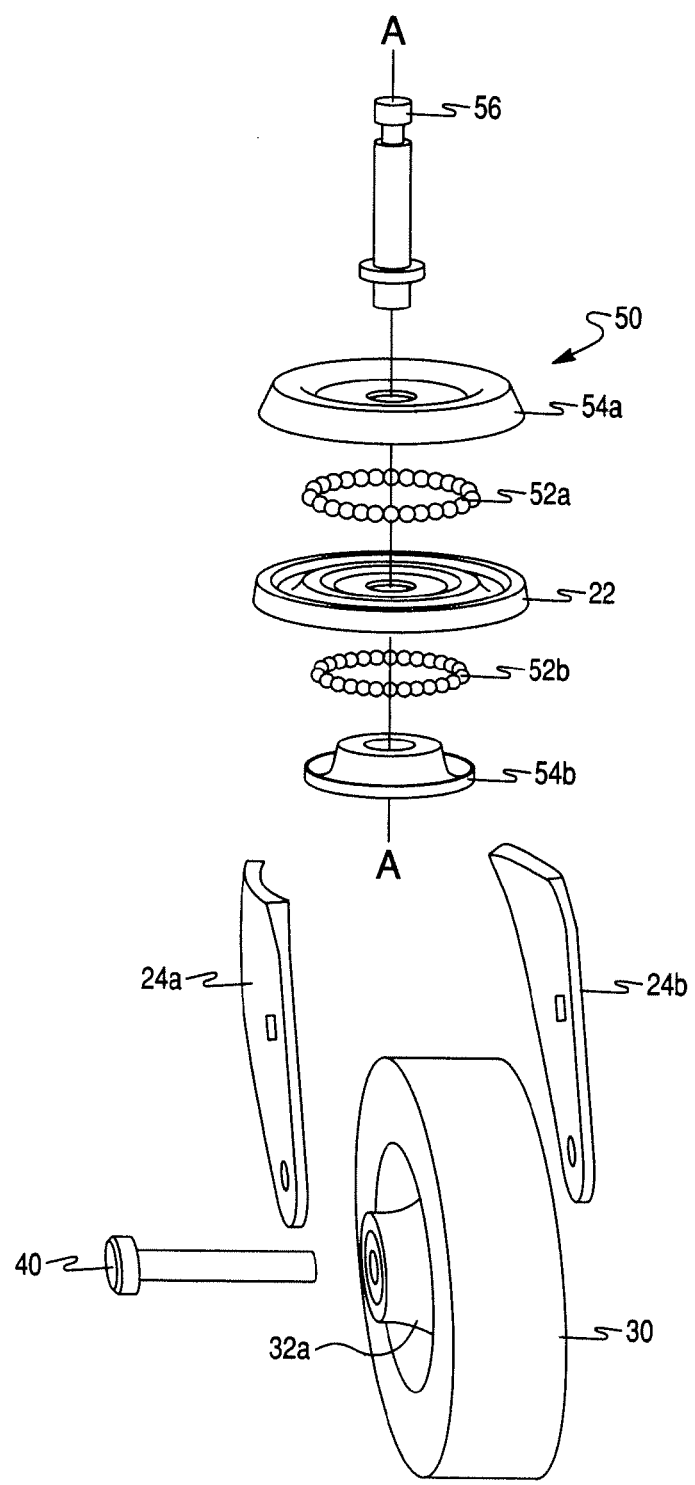
FIG. 3*a* is an exploded perspective view of the caster of FIG. 1.
Figure 3B:
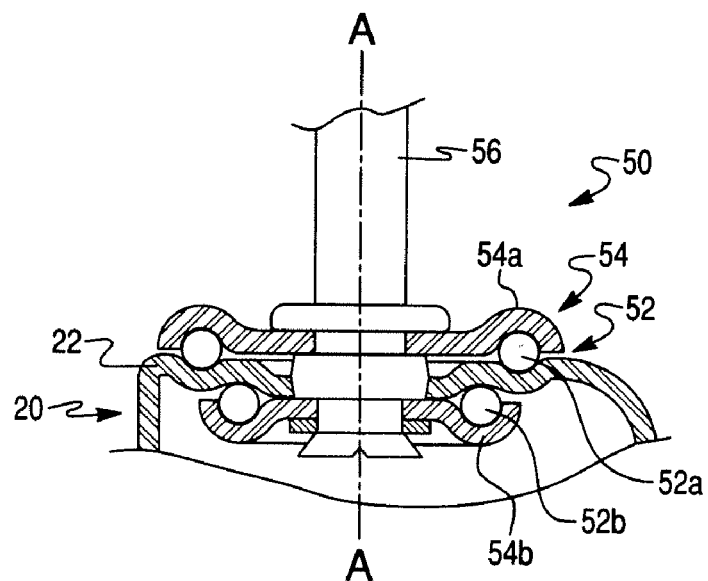
FIG. 3*b* is a cross sectional view of an interface member of the caster of FIG. 1.
Figure 4A:
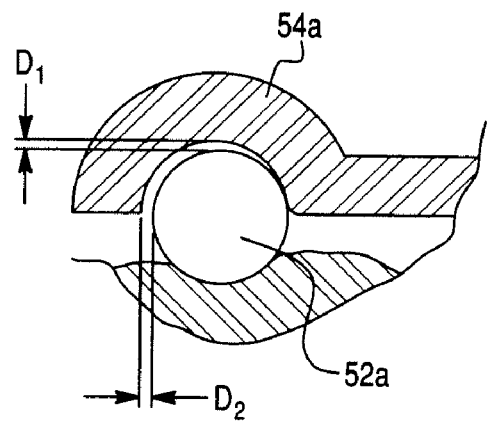
FIG. 4*a* is an enlarged view of detail B of FIG. 3*b*.
Figure 4B:
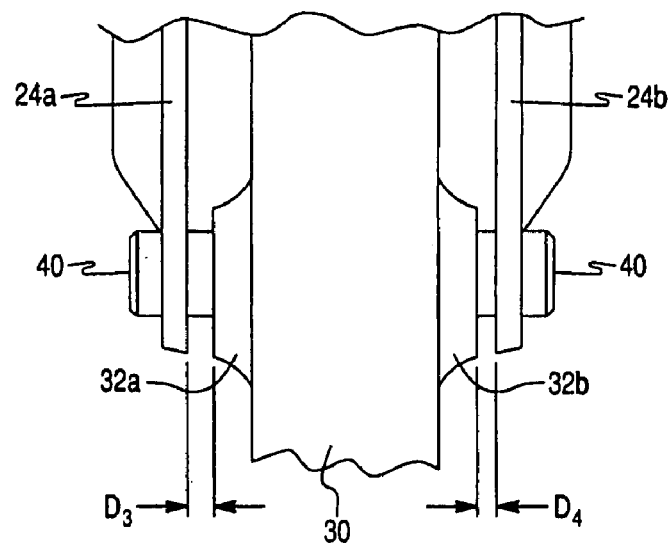
FIG. 4*b* is an enlarged view of detail A of FIG. 2.
Figure 4C:
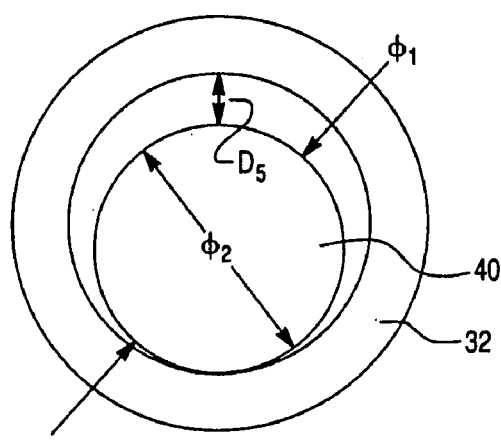
FIG. 4*c* is an enlarged side elevation view of a hub and an axle of the caster of FIG. 1.
Figure 5:
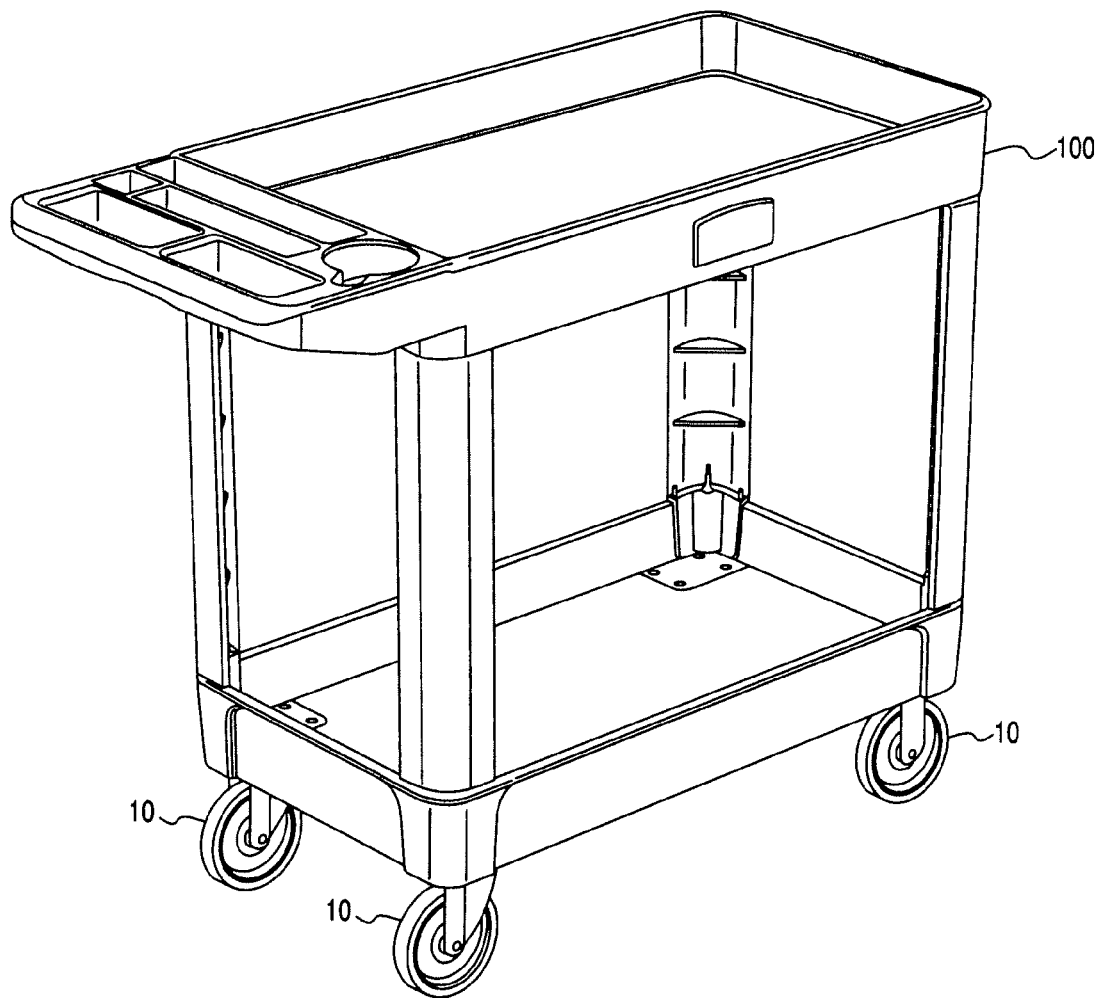
FIG. 5 is a perspective view of a moveable body that incorporates the caster of FIG. 1.

FIGS. 1 to 4*c* show an embodiment of a caster 10 according to the present invention. The caster 10 can be connected to a moveable body 100, as shown in FIG. 5, to enable the moveable body 100 to be transported from one location to another. The caster 10 includes a yoke 20, a wheel 30, an axle 40, and an interface member 50.

Figure 2:
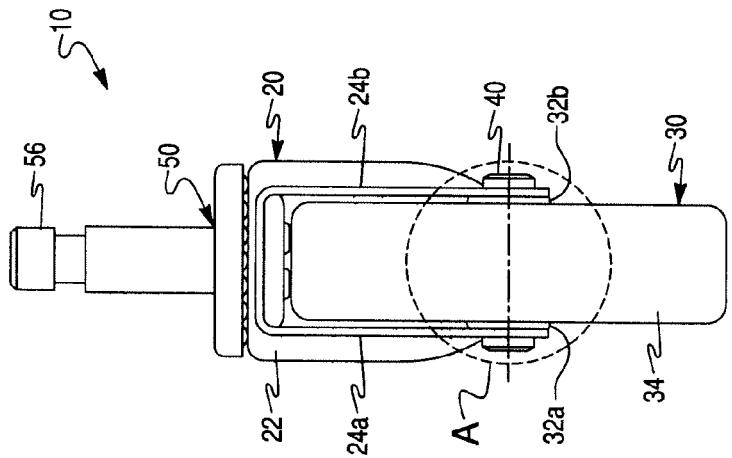
FIG. 2 is a front elevation view of the caster of FIG. 1.

The yoke 20 includes a support member 22, a first leg 24*a*, and a second leg 24*b*. The first and second legs 24*a* and 24*b* extend from an underside of the support member 22. As shown in FIG. 2, the first and second legs 24*a* and 24*b* are spaced apart from one another to accommodate the wheel 30. The first and second legs 24*a* and 24*b* can be connected to the support member 22 by conventional means, which may include being integrally formed.

The wheel 30 is disposed between the first and second legs 24a and 24b of the yoke 20. The wheel 30 includes a hub 32 located at a central portion of the wheel 30 so that the inner diameter of the hub 32 corresponds to the inner diameter of the wheel 30. The hub 32 has a first end 32a located adjacent the first leg 24a of the yoke 24 and a second end 32b located adjacent the second leg 24b of the yoke 24. As shown in FIG. 2, the first and second ends 32a and 32b of the hub 32 constitute the outermost side portions of the wheel 30. The axle 40 extends through the hub 32 to rotatably support the wheel 30 between the first and second legs 24a and 24b of the yoke 24.

The wheel 30 also can include a tread 34 that engages a surface as the wheel 30 rolls over the surface. The tread 34 can be made of a material that has a Shore A hardness of approximately 65 durometers or less. Preferably the tread material has a Shore A hardness in the range of approximately 10 to 65 durometers. More preferably, the tread material has a Shore A hardness in the range of approximately 40 to 65 durometers. The tread material can be a non-marking thermoplastic rubber. Additionally, the tread material can be colored to distinguish the caster 10 from a conventional caster.

The interface member 50 connects the yoke 20 to the moveable body 100. The interface member 50 includes a first portion 52 and a second portion 54. The first portion 52 is provided on the support member 22 of the yoke 20. The second portion 54 faces the first portion 52 and can be configured so that the yoke 20 can swivel about a vertical axis A-A relative to the second portion 54. For example, as shown in FIGS. 3a and 3b, the interface member 50 can be a swivel bearing where the first portion 52 includes ball bearings 52a and the second portion 54 includes a raceway 54a. The ball bearings 52a travel about the raceway 54a thereby enabling the yoke 20 to swivel. Preferably, the interface member 50 includes a steel double ball race having two rows of ball bearings 52a and 52b that permit independent movement of the raceways 54a and 54b relative to the support member 22, as shown in FIG. 3a.

Figure 1:
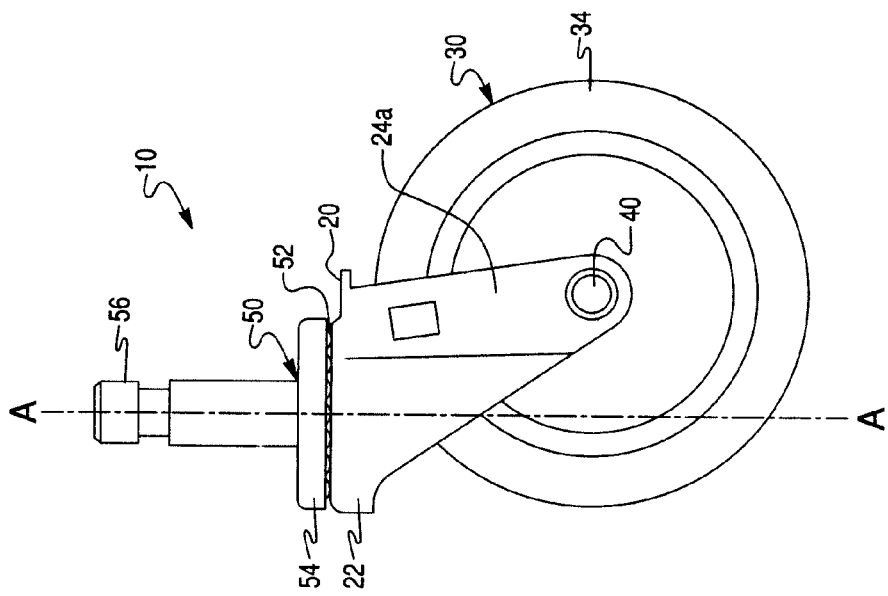
FIG. 1 is a side elevation view of an embodiment of a caster according to the present invention.
Figure 6:
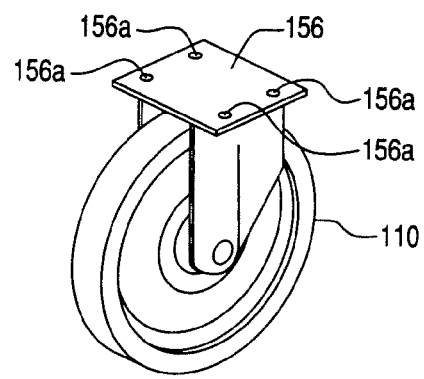
FIG. 6 is a perspective view of an embodiment of a caster according to the present invention.

The interface member 50 also includes an attachment member 56 for attaching the interface member to the moveable body 100. As shown in FIGS. 1 and 2, the caster 10 can be a stem caster, and the attachment member 56 can be a stem that is adapted to be received in an underside of the moveable body 100. As shown in FIG. 3a, the stem 56 can be assembled with the first portion 52 and the second portion 54 of the interface member 50. The stem 56 can then be staked in a conventional manner to hold the swivel assembly together. Alternatively, as shown in FIG. 6, a caster 110 can be a plate caster, and the attachment member 156 can be a plate that includes apertures 156a for mounting the attachment member 156 to the underside of a moveable body with fasteners such as bolts or screws.

The caster 10 is configured to reduce relative movement between the various components of the caster assembly so that vibration from the caster 10 as the caster 10 moves over a surface is reduced. For example, as shown in FIG. 4a, a total vertical clearance $D_1$ can exist between the first portion 52 and the second portion 54 of the interface member 50 when the interface member 50 and the yoke 20 are pulled apart (i.e., pulled in opposite directions). Total clearance refers to the maximum amount the components can be moved apart from one another by, for example, pulling them apart while the caster 10 is in the assembled condition. The total vertical clearance $D_1$ is preferably approximately 0.02 inches or less. For example, the total vertical clearance $D_1$ may be in the range of approximately 0.005 to 0.02 inches. Preferably, the total vertical clearance $D_1$ is approximately 0.005 to 0.01 inches. In other words, the interface member 50 is configured to allow no more than approximately 0.02 inches of vertical motion between the first portion 52 and the second portion 54. Additionally, a total side clearance $D_2$ between the first portion 52 (e.g., the ball bearing) and the second portion 54 (e.g., the raceway) is preferably approximately 0.05 inches or less. In other words, the interface member 50 is configured to allow no more than approximately 0.05 inches of horizontal travel from side-to-side.

A total clearance between the first and second ends 32a and 32b of the hub 32 and the first and second legs 24a and 24b of the yoke 20 is preferably approximately 0.032 inches or less. As shown in FIG. 4b, the total clearance is the sum of a clearance $D_3$ between the outermost side portion of the wheel 30 adjacent the first leg 24a and the first leg 24a and a clearance $D_4$ between the outermost side portion of the wheel 30 adjacent the second leg 24b and the second leg 24b. Thus, the total clearance is the sum of $D_3$ and $D_4$. The total clearance $(D_3+D_4)$ may be, for example, in the range of approximately 0.021 to 0.032 inches. Preferably, the total clearance $(D_3+D_4)$ is in the range of approximately 0.01 to 0.02 inches. Additionally, as shown in FIG. 4c, a total clearance $D_5$ between an inner diameter of the hub $\Phi_1$ and an outer diameter of the axle $\Phi_2$ is preferably approximately 0.008 inches or less.

Because the caster 10 is designed so that excessive movement between the components of the caster 10 is reduced, a noise level of the moveable body 100 as the moveable body 100 travels over a surface can be approximately 85 decibels or less. As a result, the moveable body 100 has an improved ability to comply with OSHA regulations and therefore is highly suitable for use in environments such as hospitals, long-term care facilities, schools, and offices. Moreover, activities requiring use of the moveable body (e.g., cleaning) are not restricted to certain times of the day. Thus, cleaning carts employing the caster 10 can be used during the day in schools and offices because such carts will not generate noise that will disturb students and office workers. Additionally, such carts can be used in hospitals and care facilities even when patients are sleeping. Moreover, the cost of the moveable body 100 may be reduced because after-market sound absorbers and vibration dampers do not need to be installed on the moveable body 100.

Other embodiments of the invention will be apparent to those skilled in the art from consideration of the specification and practice of the invention disclosed herein. It is intended that the specification and examples be considered as exemplary only.

What is claimed is:

1. A caster, comprising:
  a yoke including a support member and first and second legs extending from an underside of the support member;
  a wheel including a hub having a first end disposed adjacent the first leg of the yoke and a second end disposed adjacent the second leg of the yoke;
  an axle extending through the hub to rotatably support the wheel between the first and second legs of the yoke; and
  an interface member for attaching the yoke to a moveable body, the interface member including a first portion provided on the support member of the yoke and a second portion facing the first portion and being configured such that the yoke can swivel about a vertical axis relative to the second portion, wherein a total vertical clearance between the first and second portions of the interface member is approximately 0.02 inches or less, wherein a total clearance between the first and second ends of the hub and the first and second legs of the yoke is approximately 0.032 inches or less, wherein a total clearance between an inner diameter of the hub and an outer diameter of the axle is approximately 0.008 inches or less, and wherein the wheel includes a tread material having a Shore A hardness of approximately 65 durometers or less.

2. The caster of claim 1, wherein the tread material comprises a non-marking thermoplastic rubber.

3. The caster of claim 1, wherein the interface member includes a ball bearing and a raceway, and wherein a total side clearance between the ball bearing and the raceway is approximately 0.050 inches or less.

4. The caster of claim 1, wherein the caster is a plate caster.

5. The caster of claim 1, wherein the caster is a stem caster.

6. The caster of claim 5, wherein the interface member includes a bearing having a steel double ball race.

* * * * *